United States Patent
Safai

(10) Patent No.: US 12,140,458 B2
(45) Date of Patent: Nov. 12, 2024

(54) MONITORING APPARATUS AND METHOD

(71) Applicant: The Boeing Company, Chicago, IL (US)

(72) Inventor: Morteza Safai, Seattle, WA (US)

(73) Assignee: The Boeing Company, Chicago, IL (US)

( * ) Notice: Subject to any disclaimer, the term of this patent is extended or adjusted under 35 U.S.C. 154(b) by 334 days.

(21) Appl. No.: 17/577,883

(22) Filed: Jan. 18, 2022

(65) Prior Publication Data

US 2022/0276077 A1 Sep. 1, 2022

Related U.S. Application Data

(60) Provisional application No. 63/155,001, filed on Mar. 1, 2021.

(51) Int. Cl.
*G01D 7/00* (2006.01)
*H04W 4/80* (2018.01)

(52) U.S. Cl.
CPC ............... *G01D 7/00* (2013.01); *H04W 4/80* (2018.02)

(58) Field of Classification Search
CPC ...... G01R 15/12; G01R 15/144; G01R 19/00; G01R 19/30; G01R 21/06; G01R 31/261; G01R 31/2623
See application file for complete search history.

(56) References Cited

U.S. PATENT DOCUMENTS 11,506,546 B2 * 11/2022 Blair ........................ G01K 1/02
2020/0321515 A1 * 10/2020 Safai ...................... H02N 2/186

OTHER PUBLICATIONS

Mearian, "Wireless Charging Explained: What is it and how does it work?", Mar. 28, 2018, 19 pages.
Gibbs, "What is wireless charging and do I need it?", Sep. 13, 2017, 5 pages.

* cited by examiner

*Primary Examiner* — Tung X Nguyen
(74) *Attorney, Agent, or Firm* — Jordan IP Law, LLC

(57) ABSTRACT

Systems, apparatuses and methods provide for technology that monitors a component. A monitoring apparatus includes a sensor to monitor a state of a component, a power circuit to convert an electromagnetic signal to electrical power, a capacitor bank coupled to the power circuit and to the sensor to receive electrical power from the power circuit and to supply electrical power to the sensor, and a wireless readout to convert data from the sensor into a wireless communication signal. A method of monitoring a component includes coupling a sensor to a component, the sensor configured to monitor a state of the component, applying power to the sensor from a capacitor bank, and storing data obtained from the sensor, where the data relates to a state of the component. The method can include charging the capacitor bank via a power circuit, where the power circuit converts an electromagnetic signal to electrical power.

29 Claims, 5 Drawing Sheets

MONITORING APPARATUS AND METHOD

CROSS-REFERENCE WITH RELATED APPLICATIONS

This application is a Non-Provisional Patent Application which claims the benefit of priority to U.S. Provisional Patent Application No. 63/155,001 filed on Mar. 1, 2021.

FIELD

The disclosure relates to technology for monitoring a component. More particularly, the disclosure relates to providing power for a monitoring apparatus or system.

BACKGROUND

Piezoelectric sensors, ultrasonic transducers, and other sensors require connection to a battery or a hardwired connection to a power source in order to operate, as well as a wired connection to read out sensor data. However, current solutions have limitations. Batteries or battery packs must be large or bulky in order to supply sufficient power to the sensors. Providing wired connections to supply power or to enable sensor readout introduces complications, particularly in aircraft or other applications where sensors may need to be distributed across large areas. Limitations such as these render placement and use of sensors difficult or impractical. In addition, batteries connected to a sensor are subject to discharge or failure, rendering the sensor unusable and substantially impacting operational reliability.

Accordingly, there is a need for a self-contained sensor apparatus for monitoring applications that can be integrated into a structure.

SUMMARY

Disclosed herein are methods, devices, and systems to monitor a component by providing power to a wireless sensor via a capacitor bank. The capacitor bank is charged by exposing a charging circuit to an electromagnetic signal. A wireless readout provides sensor data without the need for a wired connection to the sensor.

In accordance with one or more examples, a monitoring apparatus comprises a sensor configured to monitor a state of a component, a power circuit configured to convert an electromagnetic signal to electrical power, a capacitor bank coupled to an output of the power circuit and to the sensor, the capacitor bank arranged to receive electrical power from the power circuit and to supply electrical power to the sensor, and a wireless readout configured to convert data obtained from the sensor into a wireless communication signal.

In accordance with one or more examples, a method of monitoring a component comprises coupling a sensor to a component, the sensor configured to monitor a state of the component, applying power to the sensor from a capacitor bank, the capacitor bank coupled to the sensor, and storing data obtained from the sensor, the data relating to the state of the component.

In accordance with one or more examples, a component monitoring system comprises a plurality of monitoring devices configured to be coupled to a component of one of an aircraft, a vehicle, or a vessel, wherein each monitoring device comprises a sensor configured to monitor a state of the component, a power circuit configured to convert an electromagnetic signal to electrical power, a capacitor bank coupled to an output of the power circuit and to the sensor, the capacitor bank arranged to receive electrical power from the power circuit and to supply electrical power to the sensor, and a wireless readout configured to convert data obtained from the sensor into a wireless communication signal.

In accordance with one or more examples, a method of monitoring a component comprises coupling a plurality of sensors to a component of one of an aircraft, a vehicle, or a vessel, each sensor configured to monitor a state of the component, applying power to each of the plurality of sensors from a respective one of a plurality of capacitor banks, each sensor coupled to the respective one of the plurality of capacitor banks, and storing data obtained from each of the plurality of sensors, the data relating to the state of the component.

The features, functions, and advantages that have been discussed can be achieved independently in various examples or may be combined in yet other examples further details of which can be seen with reference to the following description and drawings.

BRIEF DESCRIPTION OF THE DRAWINGS

The various advantages of the examples of the present disclosure will become apparent to one skilled in the art by reading the following specification and appended claims, and by referencing the following drawings, in which:

Figure 1:
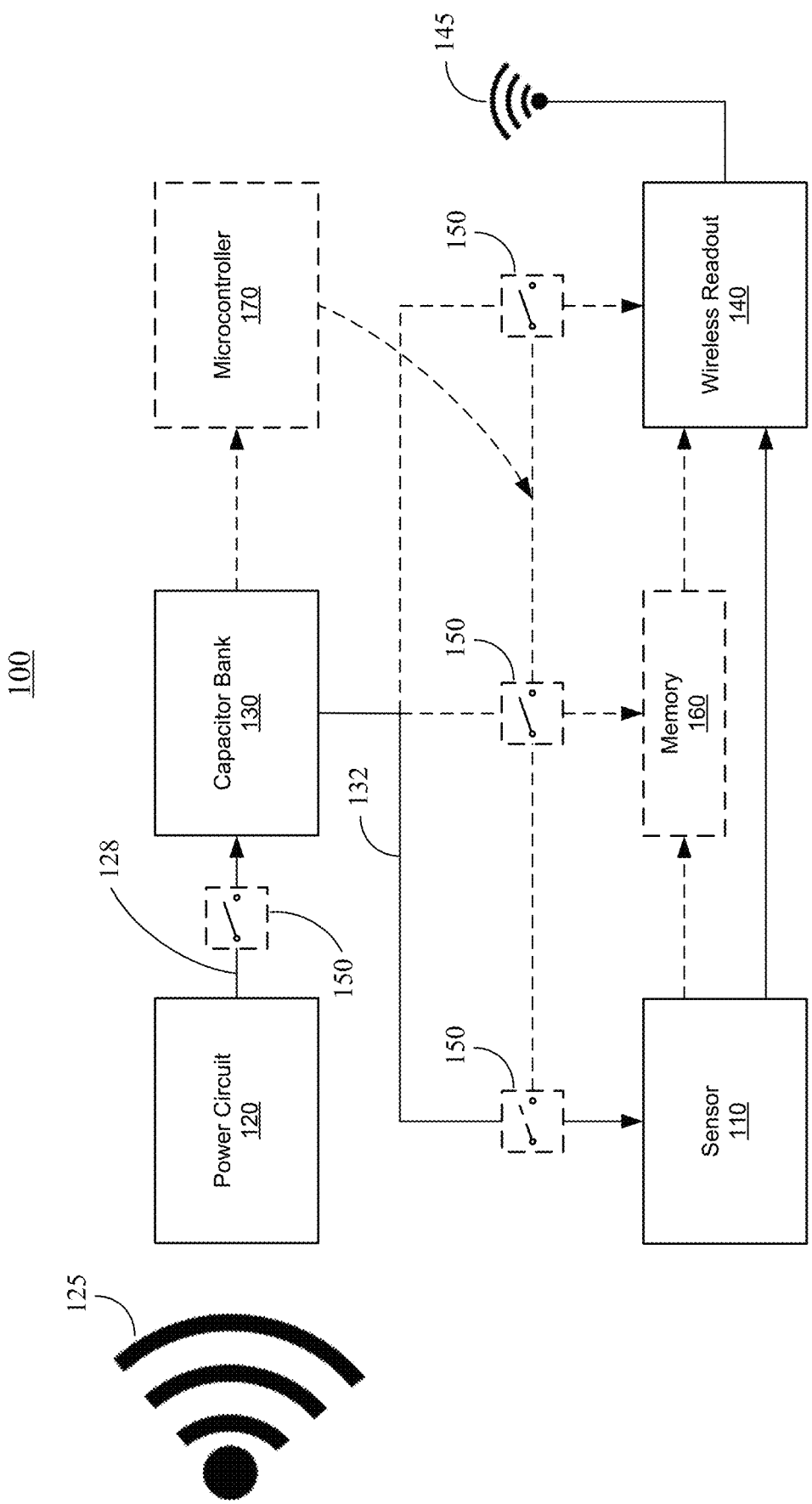
FIG. 1 provides a block diagram illustrating a monitoring apparatus according to one or more examples.

Accordingly, it is to be understood that the examples herein described are merely illustrative of the application of the principles disclosed. Reference herein to details of the illustrated examples is not intended to limit the scope of the claims, which themselves recite those features regarded as essential to the disclosure.

DESCRIPTION

Disclosed are methods, apparatuses, and systems for monitoring a component. Sensors can be used for monitoring components in a variety of applications, including those installed in an aircraft, vehicle, or vessel. When used in aircraft and aerospace systems, sensors can monitor a component (such as, e.g., a fuselage or wing of an aircraft) or perform other nondestructive inspection of systems. In aircraft applications, it is important for the sensors to operate while the aircraft is in a full or extreme load condition or during flight. There is a need for a self-contained sensor apparatus for monitoring applications that can be integrated into a structure without having to provide a wired or battery power source, and without having to provide wired access for extracting sensor data.

In one or more examples, a monitoring apparatus includes a sensor configured to monitor a state of a component, a power circuit configured to convert an electromagnetic signal to electrical power, a capacitor bank coupled to an output of the power circuit and to the sensor, where the capacitor bank is arranged to receive electrical power from the power circuit and to supply electrical power to the sensor, and a wireless readout configured to convert data obtained from the sensor into a wireless communication signal. The sensor can include a piezoelectric sensor or an electromagnetic sensor. Where the electromagnetic signal is a radio frequency (RF) signal, the power circuit can be configured to convert the RF signal to electrical power via induction. The capacitor bank can include a plurality of thin-sheet capacitors, such as graphene capacitors, arranged in a stacked assembly. The wireless communication signal can include a WiFi signal, a Bluetooth signal, or a near-field communication signal. The wireless readout can be configured for powering by an external electromagnetic signal. As so configured, a monitoring apparatus as disclosed herein provides advantages including reduced size and weight, improved efficiency, and improved reliability. Accordingly, the disclosed monitoring apparatus can be installed where needed, including in hard-to-access locations, without the complications and reliability concerns of wired or battery-powered devices. As a result, the disclosed apparatus enables monitoring of components in applications where monitoring has previously been unavailable.

The disclosed technology can also include a switch configured to activate electrical power from the capacitor bank to the sensor upon an occurrence of one or more conditions such as, for example, reaching a threshold charge amount by the capacitor bank. The one or more conditions can also include initiation of an operational mode of the component. Inclusion of a switch as described herein provides a further advantage of limiting the provision of power to the sensor to a period when the capacitor bank is sufficiently charged, or when the sensor is most likely to be needed, thereby reducing the power draw by the sensor on the capacitor bank. The disclosed technology can also include a memory coupled to the sensor, where the memory is to store the data obtained from the sensor. Inclusion of a memory as described herein provides a further advantage of capturing and retaining sensor data from the time the sensor is active until such later time as the sensor data is read using the wireless readout, particularly in situations where the sensor itself has insufficient data storage capacity.

A method of monitoring a component is disclosed that includes coupling a sensor to a component, where the sensor is configured to monitor a state of the component, applying power to the sensor from a capacitor bank, where the capacitor bank is coupled to the sensor, and storing data obtained from the sensor, where the data relates to a state of the component. The method can include charging the capacitor bank via a power circuit, where the power circuit is configured to convert an electromagnetic signal to electrical power. The method can also include activating electrical power from the capacitor bank to the sensor upon an occurrence of one or more conditions such as, for example, reaching a threshold charge amount by the capacitor bank. The one or more conditions can also include initiation of an operational mode of the component. In addition, the method can include transmitting the data obtained from the sensor via a wireless readout and applying power to the wireless readout from the capacitor bank. The method can further include irradiating the power circuit with the electromagnetic signal. As so described, the component monitoring method performed as disclosed herein provides advantages including reduced size and weight, improved efficiency, and improved reliability. Accordingly, the disclosed monitoring method enables installation and use of sensors for component monitoring where needed, including in hard-to-access locations, without the complications and reliability concerns when using wired- or battery-powered devices. The component monitoring method provides a further advantage of limiting the provision of power to the sensor to a period when the capacitor bank is sufficiently charged, or when the sensor is most likely to be needed, thereby reducing the power draw by the sensor on the capacitor bank. Additionally, storing the sensor data as described provides a further advantage of capturing and retaining sensor data from the time the sensor is active until such later time as the sensor data is read using the wireless readout.

Also disclosed is a component monitoring system that includes a plurality of monitoring devices configured to be coupled to a component of a large or complex machine or device, such as, e.g., an aircraft, a vehicle, or a vessel. In the disclosed component monitoring system, each monitoring device comprises a sensor configured to monitor a state of the component, a power circuit configured to convert an electromagnetic signal to electrical power, a capacitor bank coupled to an output of the power circuit and to the sensor, where the capacitor bank is arranged to receive electrical power from the power circuit and to supply electrical power to the sensor, and a wireless readout configured to convert data obtained from the sensor into a wireless communication signal. Where the electromagnetic signal is a radio frequency (RF) signal, each power circuit can be configured to convert the RF signal to electrical power via induction. The component monitoring system can include, for each monitoring device, a switch configured to activate electrical power from the capacitor bank to the sensor upon an occurrence of one or more conditions. The one or more conditions can include, for example, reaching a threshold charge amount by the capacitor bank. The one or more conditions can also include initiation of an operational mode of the component. The component monitoring system can also include, for each monitoring device, a memory coupled to the sensor, where the memory is to store the data obtained from the sensor. As so configured, a component monitoring system as disclosed herein provides the same advantages as described above with reference to the monitoring apparatus, and a further advantage in extending the benefits of the disclosed technology to installations (such as large or complex machines or devices) employing a plurality of monitoring devices. While the disclosed technology is not limited to monitoring applications where the sensors are the same type of sensor, the technology can be particularly advantageous when the application includes a plurality of monitoring devices each having the same type of sensor, as described further herein.

Additionally, another method of monitoring a component is disclosed that includes coupling a plurality of sensors to a component of a large or complex machine or device, such as, e.g., an aircraft, a vehicle, or a vessel. In such additional method, each sensor is configured to monitor a state of the component, applying power to each of the plurality of sensors from a respective one of a plurality of capacitor banks, where each sensor is coupled to the respective one of the plurality of capacitor banks, and storing data obtained from each of the plurality of sensors, where the data relates to the state of the component. The method can include charging each of the plurality of capacitor banks via a respective one of a plurality of power circuits, where each respective power circuit is configured to convert an electromagnetic signal to electrical power. The method can also include for each of the plurality of sensors, activating electrical power from the respective capacitor bank to the respective sensor upon an occurrence of one or more conditions. The one or more conditions can include reaching a threshold charge amount by the respective capacitor bank or initiation of an operational mode of the component. Further, the method can include applying power to a wireless readout, and transmitting the data obtained from the sensor via the wireless readout. As so described, the additional component monitoring method performed as disclosed herein provides the same advantages as described above with reference to the component monitoring method, and a further advantage in extending the benefits of the disclosed technology to installations (such as large or complex machines or devices) employing a plurality of monitoring devices. While the disclosed technology is not limited to monitoring applications where the sensors are the same type of sensor, the technology can be particularly advantageous when the application includes a plurality of monitoring devices each having the same type of sensor, as described further herein.

FIG. 1 is a block diagram illustrating a monitoring apparatus 100 according to one or more examples, with reference to components and features described herein including but not limited to the figures and associated description. The monitoring apparatus 100 includes a sensor 110, a power circuit 120, a capacitor bank 130 coupled to the sensor 110 and to the power circuit 120, and a wireless readout 140 coupled to the sensor 110. The sensor 110 is configured to monitor a state of a component and to provide data relating to the monitoring. For example, the sensor can be configured to monitor changes in a condition of or in the performance of a component of an aircraft, vehicle, or vessel. The sensor 110 is arranged to receive power from the capacitor bank 130. In one or more examples, the sensor 110 is to receive power solely from the capacitor bank 130. In one or more examples, the sensor 110 can also receive power from an auxiliary power source (not shown in FIG. 1).

The sensor 110 can be, for example, a piezoelectric sensor or an electromagnetic sensor, or virtually any type of sensor requiring electrical power to operate. The sensor 110 can include other types of sensors for various applications, including, for example, an ultrasonic transducer, a temperature sensor, a humidity sensor, a strain gauge, etc. The sensor 110 can be selected based on the particular monitoring application and the component state being monitored. The state of a component to be monitored can vary based on a variety of factors, such as, e.g., the type of component, the component structure, and/or the function of the component, etc. The component state to be monitored may include, e.g., a change in a condition of or in the performance of the component. As one example, the component can be of a type of material (such as, e.g., metal) which is to be monitored for stresses, integrity (e.g., for cracks, etc.). As another example, the component can be part of a structure which needs to be monitored for placement or movement. As yet another example, the component can be a material or device which needs to be monitored for temperature, humidity, etc. Monitoring applications can include one or more of a wide variety of non-destructive inspection (NDI) of systems or components. As one example, in aircraft applications an ultrasonic transducer can be selected as the sensor 110 to monitor the state of one or more components of an aircraft for stresses, cracks, etc. The foregoing examples are described for illustrative purposes only, and the disclosed technology is not limited in application to the examples described herein.

The power circuit 120 is configured to convert an electromagnetic signal 125 to electrical power, the electrical power to be supplied as an output charging signal 128 to charge the capacitor bank 130. Typically, the output charging signal 128 is a direct-current (DC) voltage, and can range, e.g., from 1V to 100V (or higher), depending upon the electromagnetic signal 125, the power circuit 120, the capacitor bank 130, the sensor 110, and/or the requirements of the monitoring application. For example, ultrasonic transducers use short bursts of high power (e.g., 100V) to actuate the crystal to create a sound wave, while graphene-based sensors only use a small amount of power.

In one or more examples, the electromagnetic signal 125 is a radio frequency (RF) signal, and the power circuit 120 is configured to convert the RF signal to electrical power via induction. The power circuit 120 can include, e.g., one or more inductors to enable induction. The power circuit 120 can include other components such as, e.g., one or more resistors, one or more capacitors, etc. as appropriate to filter the output charging signal 128 for supply to the capacitor bank 130. The power circuit 120 can also include a transformer to provide a suitable voltage level for the output charging signal 128.

The electromagnetic signal 125 can be generated by a separate transmitter (not shown) at a suitable frequency and power level, and for a sufficient time such that, when irradiated by the electromagnetic signal 125 (e.g., a radio frequency (RF) signal), the power circuit 120 can convert the electromagnetic signal 125 into electrical power for charging the capacitor bank 130 to capacity. The separate transmitter can be, e.g., a hand-held device or part of a portable device, such that the electromagnetic signal 125 can irradiate the power circuit 120 of the monitoring apparatus 100, without physical connection to the monitoring apparatus 100, on an as-needed basis and be removed once the charging process is complete.

The capacitor bank 130 includes a plurality of capacitors that are selected as suitable for a particular monitoring application, including power or voltage requirements. For example, the plurality of capacitors can include capacitors of one or more of a variety of capacitor types, such as thin-sheet capacitors. The capacitor bank 130 is coupled to the power circuit 120, and is arranged to receive electrical power from the power circuit 120 via output charging signal 128. Upon receiving power via output charging signal 128, the capacitors in capacitor bank 130 will charge until a charge capacity is reached. The amount of charge, and the voltage of the charge, will depend upon the specific configuration of capacitors in capacitor bank 130. The capacitor bank 130 is also coupled to the sensor 110, and is arranged to supply electrical power to the sensor 110 via power supply signal 132. As arranged in FIG. 1, the sensor 110 receives electrical power from the capacitor bank 130. The power supplied via power supply signal 132 is of sufficient voltage and power level to enable active operation of the sensor 110. Additional details for capacitor bank 130 are described herein with reference to FIGS. 2A-2C.

The wireless readout 140 is coupled to the sensor 110, and is configured to convert data obtained from the sensor 110 into a wireless communication signal 145. The wireless communication signal 145 can be a signal type such as a radio frequency (RF) signal, a WiFi signal, a Bluetooth signal, a near-field communication signal, etc. The signal type for the wireless communication signal 145 can be selected as suitable for a particular monitoring application, and can depend on factors such as transmission distance or path from the wireless readout to a wireless receiver (not shown in FIG. 1). In one or more examples, the wireless readout 140 is configured for powering by an external electromagnetic signal. In one or more examples, the wireless readout 140 obtains sensor data directly from the sensor 110. In other examples, the wireless readout 140 obtains sensor data that has been stored in a memory 160 (further described herein). As so configured, the monitoring apparatus 100 can be integrated into a structure while bypassing the need to provide a wired or battery power source, and bypassing the need to provide wired access for extracting sensor data.

The monitoring apparatus 100 can include one or more switches 150 (shown in FIG. 1 in dotted lines). In one or more examples, the power provided to the sensor 110 can be supplied through a switch 150, placed in line with the power supply signal 132, to turn the power on or off. The switch 150 can be configured to activate electrical power from the capacitor bank 130 (via power supply signal 132) to the sensor 110 upon an occurrence of one or more conditions. The one or more conditions can include reaching a threshold charge amount by the capacitor bank. The threshold charge amount is an amount suitable for powering the sensor 110 for a length of time as required for the particular monitoring application. The one or more conditions can also (or alternatively) include initiation of an operational mode of the component, such as, e.g., putting the component (or a device or machine that includes the component) into active usage or operation. Each of the switches 150 can be selected as suitable for the condition(s), and can include a variety of types of electronic or electromagnetic switches—which can, in turn, include sensing elements suitable for the condition(s). As one example, in aircraft applications (where the component is part of the aircraft), the operational mode can include one or more of takeoff, landing, cruising altitude, etc., and the switch 150 can include an accelerometer and/or an altitude switch. As another example, in vehicle applications the initiation of an operational mode can include one or more of engine startup, drive engagement, etc. As yet another example, for electronic devices the initiation of an operational mode can include power on, boot-up, etc. The foregoing examples are described for illustrative purposes only, and the disclosed technology is not limited in application to the examples described herein.

In one or more examples, the switch 150 can be a small transistor circuit. In one or more examples, a switch 150 can be placed in line with the output charging signal 128 to activate, upon sensing the presence of the electromagnetic signal 125, charging power from the power circuit 120 to the capacitor bank 130 until the capacitor bank reaches capacity. In one or more examples, a switch 150 can be placed in line with a power signal (shown in dotted lines in FIG. 1) from the capacitor bank 130 to the wireless readout 140 to provide power to the wireless readout upon a readout condition such as, e.g., presence of a receiver to receive the wireless communication signal 145.

The monitoring apparatus 100 can include a memory 160 (shown in FIG. 1 in dotted lines) to store data obtained from the sensor 110. The memory 160 can be of a capacity and type as suitable for a particular monitoring application. For example, the memory 160 can be random access memory (RAM), flash memory, etc. Where the memory 160 is included in the monitoring apparatus 100, the wireless readout 140 is logically coupled to the sensor 110 via the memory 160.

The capacitor bank 130 can supply power to the memory 160. In one or more examples, the power can be supplied to memory 160 through a switch 150, which can be the same switch as used to supply power to the sensor 110, or a separate switch. In one or more examples, the sensor 110 can provide an output or can include sufficient data storage for the particular monitoring application such that memory 160 is not included.

One or more of the switches 150 can be combined with or integrated in a microcontroller 170. The microcontroller 170 can be powered by the capacitor bank 130, to control the one or more switches 150 and carry out the switching functions described herein. For example, the microcontroller 170 can perform one or more functions including: determining when conditions for activating power to the sensor 110 are met (including sensing when the capacitor bank has reached a threshold charge, sensing when an operational mode of the component has been initiated, etc.); determining when signals or data should be read from the sensor 110; determining when and where in the memory 160 to store the sensor data; and determining when to read data from the memory 160.

The microcontroller 170 can include circuitry and/or a microprocessor, and can be implemented, e.g., as a microelectromechanical system or other microsystem, via flexible circuitry. The implementation of the microcontroller 170 can include one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Figure 2A:
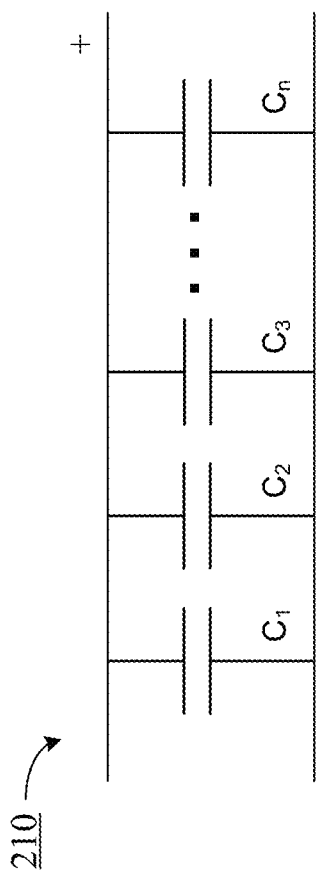
FIGS. 2A-2C provide diagrams illustrating aspects of a capacitor bank for use in a monitoring apparatus according to one or more examples.
Figure 2B:
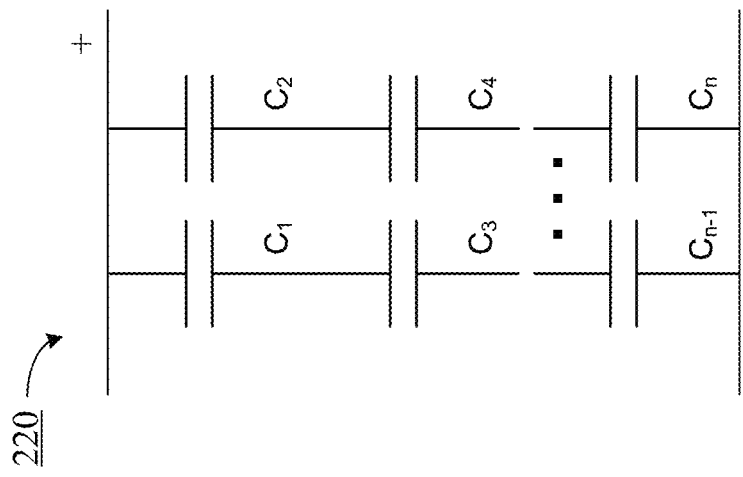

FIGS. 2A-2B provide diagrams illustrating a capacitor bank 210 and a capacitor bank 220, each for use in a monitoring apparatus (such as monitoring apparatus 100 in FIG. 1, already discussed) according to one or more examples, with reference to components and features described herein including but not limited to the figures and associated description. As shown in FIG. 2A, the capacitor bank 210 includes a set of N capacitors $C_1, C_2, C_3, \ldots, C_N$ arranged in a parallel configuration. As shown in FIG. 2B, the capacitor bank 220 includes a set of N capacitors $C_1, C_2, C_3, C_4 \ldots, C_{N-1}, C_N$ arranged in a series-parallel configuration. In each case, the capacitors in the capacitor bank 210 and the capacitor bank 220 are selected as suitable for a particular monitoring application. For example, the plurality of capacitors can include capacitors of one or more of a variety of capacitor types, such as thin-sheet capacitors. Each of capacitor bank 210 and capacitor bank 220 can correspond to capacitor bank 130 (FIG. 1, already discussed); any of capacitor bank 210, or capacitor bank 220, or other capacitor configurations can be utilized for capacitor bank 130.

Figure 2C:
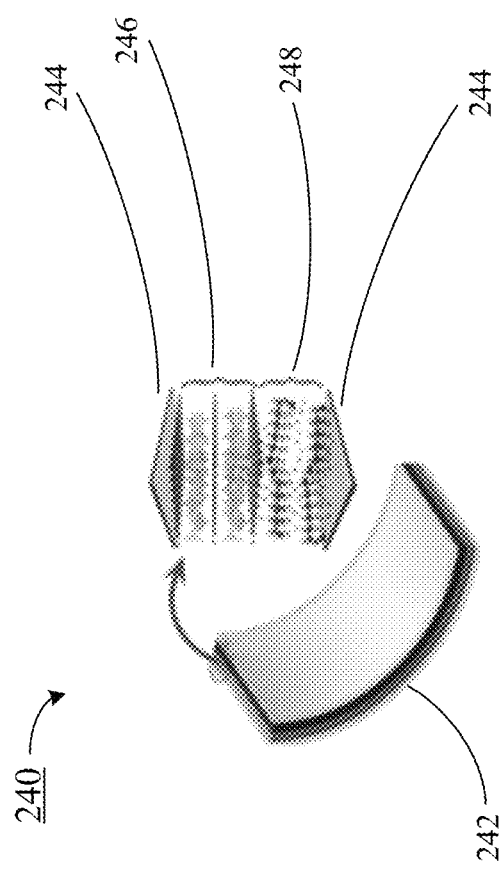

FIG. 2C is a diagram 240 illustrating a thin-sheet capacitor 242 for use in a capacitor bank in a monitoring apparatus according to one or more examples, with reference to components and features described herein including but not limited to the figures and associated description. The thin-sheet capacitor 242 illustrated in FIG. 2C is a flexible capacitive device constructed from a series of layers, including outer layers 244 and inner layers 246. The thin-sheet capacitor 242 can be a graphene capacitor. In one or more examples, the outer layers 244 can include a gold (AU)-coated polyethylene terephthalate (PET) substrate, and the inner layers 246 can include a series of graphene and vanadium phosphate ($VOPO_4$) hybrid layers. A PVA lithium chloride (LiCl) electrolyte gel 248 can be dispersed between layers. Other constructions of a thin-sheet capacitor 242 can be used, including constructions using graphene layers. A plurality of thin-sheet capacitors 242 can be arranged in a stacked assembly to form a capacitor bank 130.

Figure 3:
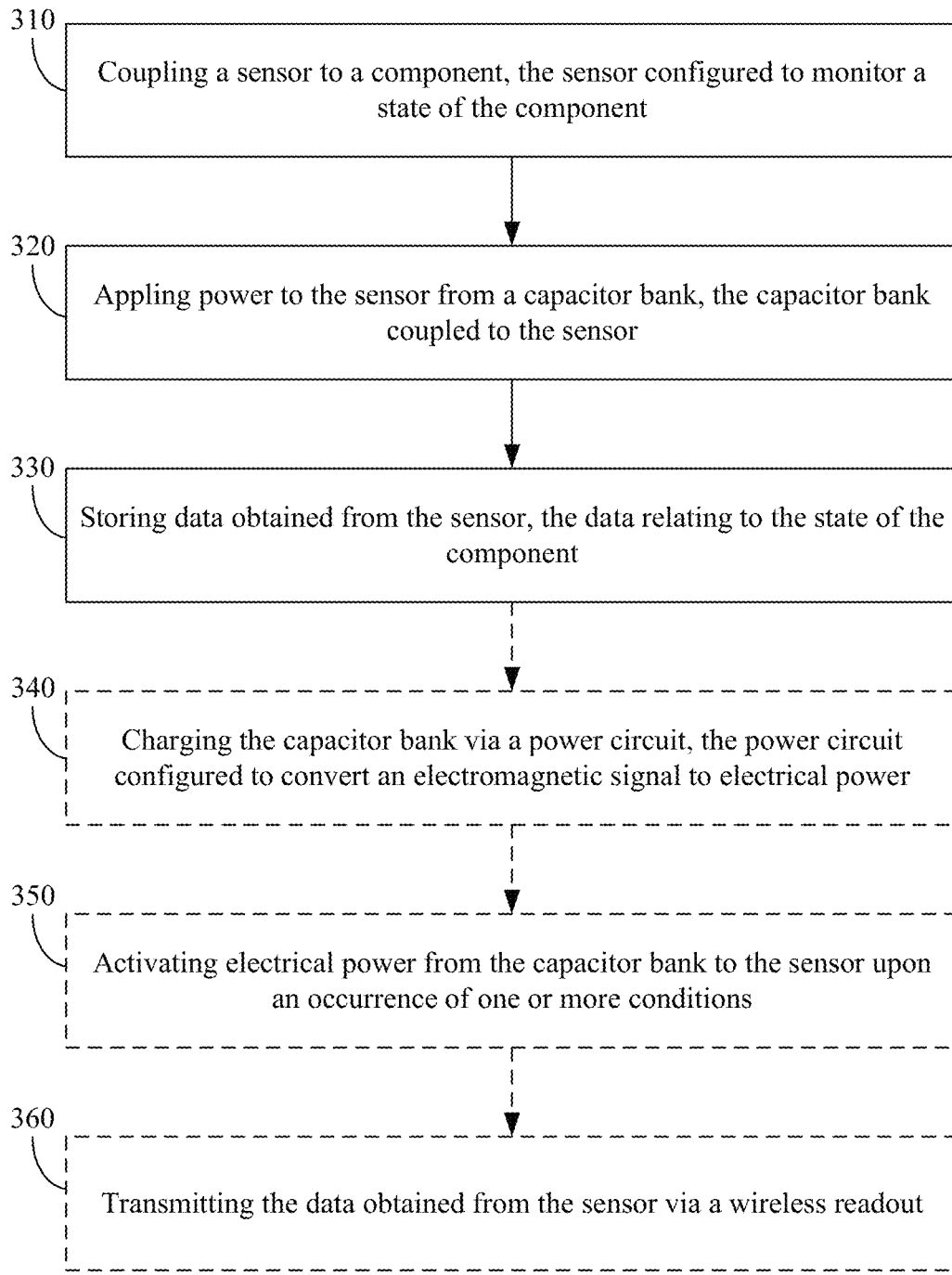
FIG. 3 provides a flow diagram illustrating a method of monitoring a component according to one or more examples.

FIG. 3 is a flow diagram illustrating a method 300 of monitoring a component according to one or more examples, with reference to components and features described herein including but not limited to the figures and associated description. The method 300 can begin as illustrated in process block 310 by coupling a sensor (such as the sensor 110 in FIG. 1, already discussed) to a component. The sensor is configured to monitor a state of the component. For example, the sensor can be configured to monitor changes in a condition of or in the performance of a component of an aircraft, vehicle, or vessel. The method 300 then proceeds as shown in process block 320 by applying power to the sensor from a capacitor bank (such as the capacitor bank 130 in FIG. 1, already discussed), where the capacitor bank is coupled to the sensor. As shown in process block 330, the method 300 continues by storing data obtained from the sensor, where the data relates to the state of the component. The data obtained from the sensor can, in one or more examples, be obtained by reading the sensor data and storing the data in a memory (such as the memory 160 in FIG. 1, already discussed).

As illustrated in the flow diagram of FIG. 3, the method 300 can further include, at process block 340, charging the capacitor bank via a power circuit (such as the power circuit 120 in FIG. 1, already discussed). The power circuit is configured to convert an electromagnetic signal (such as the electromagnetic signal 125 in FIG. 1, already discussed) to electrical power. In one or more examples, the electromagnetic signal is a radio frequency (RF) signal, and the power circuit is configured to convert the RF signal to electrical power via induction. At process block 350, the method 300 can further include activating electrical power from the capacitor bank to the sensor upon an occurrence of one or more conditions. The one or more conditions can include reaching a threshold charge amount by the capacitor bank and/or initiation of an operational mode of the component. As an example, in aircraft applications (where the component is part of the aircraft), the operational mode can include one or more of takeoff, landing, cruising altitude, etc. Additionally, the method 300 can further include, at process block 360, transmitting the data obtained from the sensor via a wireless readout. The wireless readout transmits a wireless communication signal such as, e.g. a WiFi signal, a Bluetooth signal, or a near-field communication signal.

Method 300 can further include irradiating the power circuit with the electromagnetic signal (not shown in FIG. 3), such as a radio frequency (RF) signal. The electromagnetic signal (such as electromagnetic signal 125 in FIG. 1, already discussed) can be generated by a separate transmitter (not shown) at a suitable frequency and power level, and for a sufficient time such that, when irradiated by the electromagnetic signal (e.g., a radio frequency (RF) signal), the power circuit can convert the electromagnetic signal into electrical power for charging the capacitor bank to capacity. The separate transmitter can be, e.g., a hand-held device or part of a portable device, such that the electromagnetic signal can irradiate the power circuit, without physical connection to the power circuit, on an as-needed basis and be removed once the charging process is complete.

One or more elements of method 300, such as process block 350, can be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Figure 4:
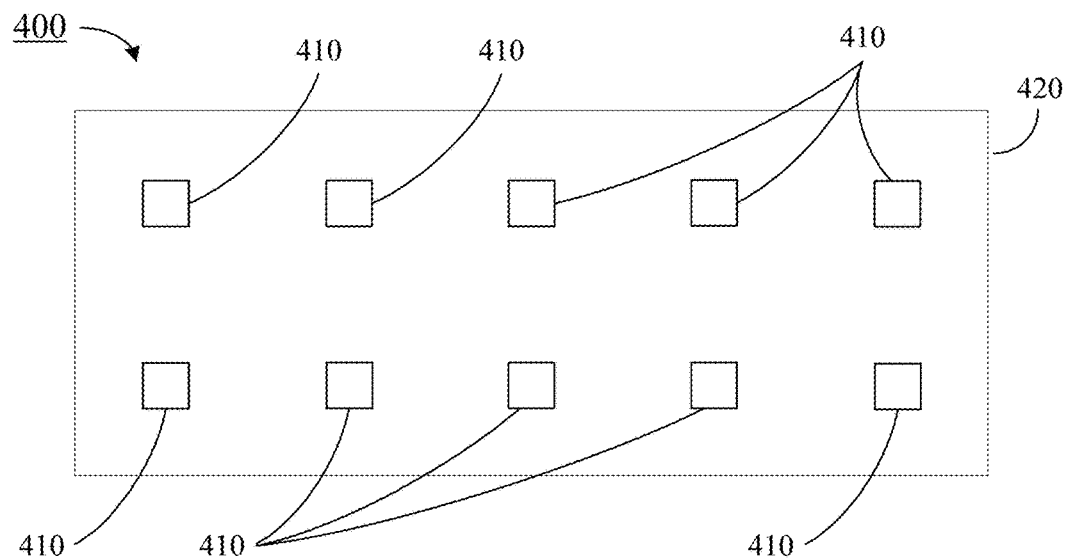
FIG. 4 provides a diagram illustrating a component monitoring system according to one or more examples.

FIG. 4 is a diagram illustrating a component monitoring system 400 according to one or more examples, with reference to components and features described herein including but not limited to the figures and associated description. The component monitoring system 400 includes a plurality of monitoring devices 410 configured for monitoring a state of a component 420. In various applications, the component 420 can include, e.g., a fuselage of an aircraft, a frame of a vehicle, a hull of a vessel, etc.

Each monitoring device 410 can correspond to the monitoring apparatus 100 (FIG. 1, already described), and the number of monitoring devices 410 can be selected and arranged respective to the component 420 as suitable for the particular monitoring application. Thus, the component monitoring system 400 includes a plurality of monitoring devices 410 configured to be coupled to a component 420 of one of an aircraft, a vehicle, or a vessel. Each monitoring device 410 includes a sensor (such as the sensor 110 in FIG. 1, already discussed) configured to monitor a state of the component 420, a power circuit (such as the power circuit 120 in FIG. 1, already discussed) configured to convert an electromagnetic signal to electrical power, a capacitor bank (such as the capacitor bank 130 in FIG. 1, already discussed) coupled to an output of the power circuit and to the sensor, where the capacitor bank is arranged to receive electrical power from the power circuit and to supply electrical power to the sensor, and a wireless readout (such as the wireless readout 140 in FIG. 1, already discussed) configured to convert data obtained from the sensor into a wireless communication signal. The monitoring devices can be aligned in an array or dispersed in a manner suitable for the particular monitoring application.

The electromagnetic signal (such as electromagnetic signal 125 in FIG. 1, already discussed) can be generated by a separate transmitter (not shown) at a suitable frequency and power level such that, when irradiated by the electromagnetic signal, the respective power circuit can convert the electromagnetic signal into electrical power for charging the respective capacitor bank. The separate transmitter can be, e.g., a hand-held device or part of a portable device, such that the electromagnetic signal can irradiate the power circuit of the monitoring device 410, without physical connection to the monitoring device 410, on an as-needed basis and be removed once the charging process is complete. Although ten (10) monitoring devices are shown in the component monitoring system 400 of FIG. 4 for purposes of illustration, the number of monitoring devices 410 for a particular monitoring application can be greater than or less than ten. Depending on the arrangement of the monitoring devices 410, some or all of the capacitor banks in the monitoring devices 410 can be charged simultaneously via a common irradiation from a suitable transmitter.

In one or more examples, the monitoring devices 410 can be controlled by a microcontroller (not shown in FIG. 4) coupled to each of the monitoring devices 410 (e.g., via coupling with one or more switches 150 in each monitoring device 410) to control the one or more switches 150 and carry out the switching functions described herein. For example, the microcontroller can be coupled to each of the monitoring devices 410 to control activation of electrical power to each of the sensors. Activation of electrical power to each of the sensors can be based on one or more conditions such as, e.g., reaching a threshold charge amount by the capacitor bank. The one or more conditions can also include initiation of an operational mode of the component. While the disclosed technology is not limited to monitoring applications where the sensors are the same type of sensor, the technology can be particularly advantageous when the application includes a plurality of monitoring devices each having the same type of sensor. For example, where each monitoring device has the same type of sensor, the microcontroller can control activation of electrical power to each of the sensors based on, e.g., a common condition applicable to each of the sensors. In such applications the microcontroller design may be less complex than in applications where the sensor types and/or conditions in each monitoring device are different.

The microcontroller can include circuitry and/or a microprocessor, and can be implemented, e.g., as a microelectromechanical system or other microsystem, via flexible circuitry. The implementation of the microcontroller can include one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Figure 5:
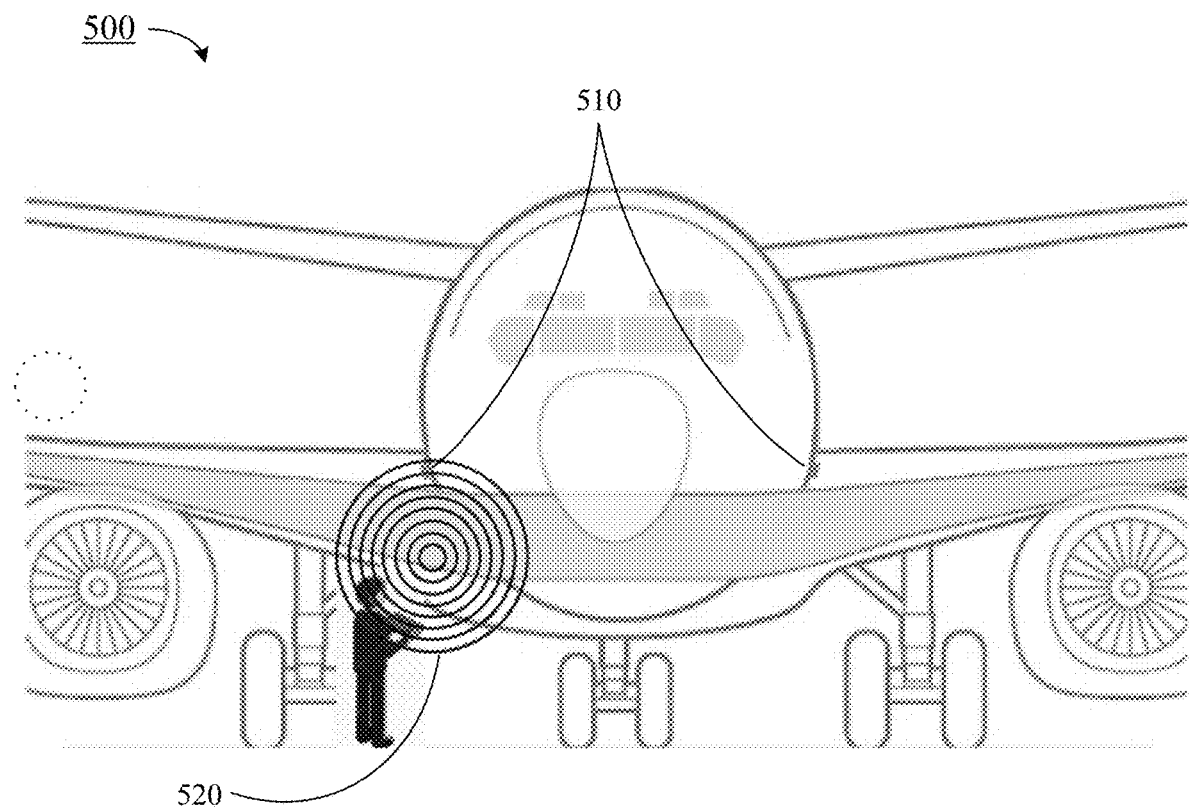
FIG. 5 provides a diagram illustrating an exemplary application for a component monitoring apparatus or monitoring system according to one or more examples.

FIG. 5 is a diagram 500 illustrating an exemplary monitoring application for a component monitoring apparatus or monitoring system according to one or more examples, with reference to components and features described herein including but not limited to the figures and associated description. The exemplary monitoring application illustrated in FIG. 5 is for an aircraft having components such as an aircraft fuselage, but other monitoring applications for other components can be implemented according to the teachings of this disclosure. As shown in FIG. 5, a monitoring apparatus 510 is mounted on each side of the aircraft to monitor, e.g., the fuselage. Other configurations are possible. Each monitoring apparatus 510 can correspond to the monitoring apparatus 100 (FIG. 1, already discussed). In one or more examples, each monitoring apparatus 510 can correspond to a component monitoring system 400 including a plurality of monitoring devices 410 (FIG. 4, already discussed). As illustrated in FIG. 5, to initiate the charging process a person holding a suitable radio frequency (RF) transmitter aims the transmitter such that an RF signal 520 irradiates the closest monitoring apparatus 510 and charges the capacitor bank (or capacitor banks, in the case of a monitoring system) contained therein.

Once the charging process is complete, the person can turn off the transmitter or move the transmitter to a location suitable for irradiating another monitoring apparatus 510 to charge the capacitor bank (or capacitor banks, in the case of a monitoring system) therein. In the illustrated example of an aircraft, this charging process would typically be completed pre-flight. After the flight has completed, a person using a suitable receiver (not shown in FIG. 5) can receive a signal generated by the wireless readout of the monitoring apparatus 510, from which the sensor data can be decoded.

Figure 6:
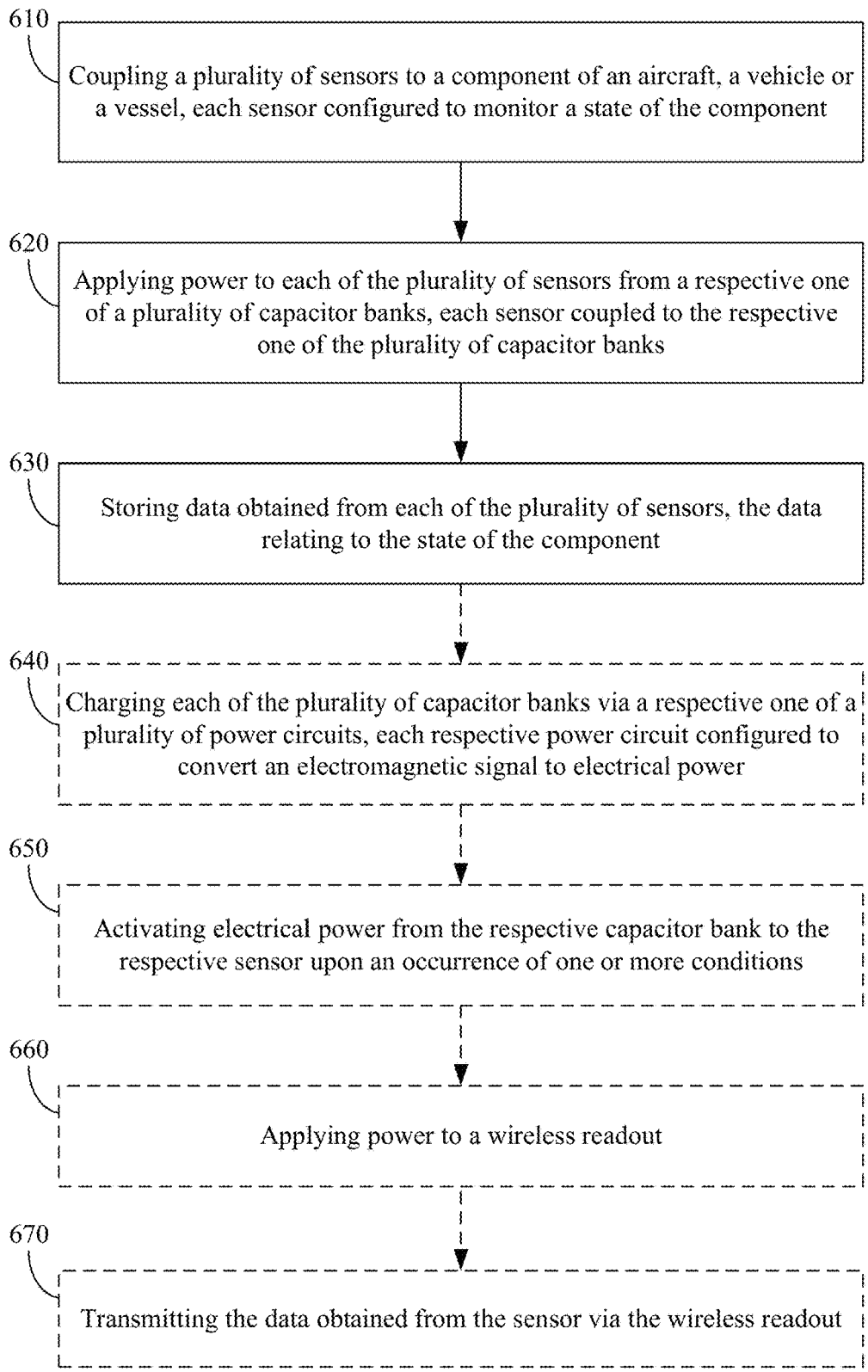
FIG. 6 provides a flow diagram illustrating a method of monitoring a component according to one or more examples.

FIG. 6 is a flow diagram illustrating a method 600 of monitoring a component according to one or more examples, with reference to components and features described herein including but not limited to the figures and associated description. As illustrated in process block 610, the method 600 can begin by coupling a plurality of sensors to a component of one of an aircraft, a vehicle, or a vessel, each sensor configured to monitor a state of the component. Each of the sensors can correspond to the sensor 110 (FIG. 1, already discussed). The component can correspond to the component 420 (FIG. 4, already discussed) and can include, e.g., a fuselage of an aircraft, a frame of a vehicle, a hull of a vessel, etc. At process block 620, the method 600 proceeds by applying power to each of the plurality of sensors from a respective one of a plurality of capacitor banks, where each sensor is coupled to the respective one of the plurality of capacitor banks. Each of the respective capacitor banks can correspond to the capacitor bank 130 (FIG. 1, already discussed). The method 600 continues, at process block 630, by storing data obtained from each of the plurality of sensors, where the data relates to the state of the component. The data obtained from each sensor can, in one or more examples, be obtained by reading the sensor data and storing the data in a respective memory (such as the memory 160 in FIG. 1, already discussed).

As shown in the flow diagram of FIG. 6, the method 600 can further include, at process block 640, charging each of the plurality of capacitor banks via a respective one of a plurality of power circuits, where each respective power circuit is configured to convert an electromagnetic signal (such as the electromagnetic signal 125 in FIG. 1, already discussed) to electrical power. Each respective power circuit can correspond to the power circuit 120 (FIG. 1, already discussed). In one or more examples, the electromagnetic signal is a radio frequency (RF) signal, and each respective power circuit is configured to convert the RF signal to electrical power via induction. The method 600 can further include for each of the plurality of sensors, at process block 650, activating electrical power from the respective capacitor bank to the respective sensor upon an occurrence of one or more conditions. The one or more conditions can include reaching a threshold charge amount by the capacitor bank and/or initiation of an operational mode of the component. As an example, in aircraft applications (where the component is part of the aircraft), the operational mode can include one or more of takeoff, landing, cruising altitude, etc. Additionally, the method 600 can include for each of the plurality of sensors, at process block 660, applying power to a wireless readout and, at process block 670, transmitting the data obtained from the sensor via the wireless readout. The wireless readout transmits a wireless communication signal such as, e.g. a WiFi signal, a Bluetooth signal, or a near-field communication signal.

Method 600 can further include irradiating each power circuit with the electromagnetic signal (not shown in FIG. 6), such as a radio frequency (RF) signal. The electromagnetic signal (such as electromagnetic signal 125 in FIG. 1, already discussed) can be generated by a separate transmitter (not shown) at a suitable frequency and power level, and for a sufficient time such that, when irradiated by the electromagnetic signal (e.g., a radio frequency (RF) signal), the power circuit can convert the electromagnetic signal into electrical power for charging the capacitor bank to capacity. The separate transmitter can be, e.g., a hand-held device or part of a portable device, such that the electromagnetic signal can irradiate the power circuit, without physical connection to the power circuit, on an as-needed basis and be removed once the charging process is complete. In one or more examples, depending on the arrangement of the respective plurality of power circuits, some or all of the respective capacitor banks can be charged simultaneously via a common irradiation from a suitable transmitter. When irradiating each respective power circuit with a radio frequency (RF) signal for a sufficient time, each respective capacitor bank can be charged to capacity.

One or more elements of method 600, such as process block 650, can be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

ADDITIONAL NOTES AND EXAMPLES

Further, the disclosure comprises additional examples as detailed in the following clauses.

Clause 1. A monitoring apparatus comprising:
a sensor configured to monitor a state of a component;
a power circuit configured to convert an electromagnetic signal to electrical power;
a capacitor bank coupled to an output of the power circuit and to the sensor, the capacitor bank arranged to receive electrical power from the power circuit and to supply electrical power to the sensor; and
a wireless readout configured to convert data obtained from the sensor into a wireless communication signal.

Clause 2. The apparatus of clause 1, wherein:
the electromagnetic signal is a radio frequency (RF) signal; and
the power circuit is configured to convert the RF signal to electrical power via induction.

Clause 3. The apparatus of clause 2, further comprising a switch configured to activate electrical power from the capacitor bank to the sensor upon an occurrence of one or more conditions.

Clause 4. The apparatus of clause 3, further comprising a memory coupled to the sensor, the memory to store the data obtained from the sensor.

Clause 5. The apparatus of clause 3 or 4, wherein the one or more conditions includes reaching a threshold charge amount by the capacitor bank.

Clause 6. The apparatus of clause 5, wherein the one or more conditions further includes initiation of an operational mode of the component.

Clause 7. The apparatus of any of clauses 1-6, wherein the sensor comprises a piezoelectric sensor or an electromagnetic sensor.

Clause 8. The apparatus of any of clauses 1-7, wherein the capacitor bank comprises a plurality of thin-sheet capacitors arranged in a stacked assembly.

Clause 9. The apparatus of clause 8, wherein each of the plurality of thin-sheet capacitors comprises graphene capacitors.

Clause 10. The apparatus of any of clauses 1-9, wherein the wireless communication signal comprises one of a WiFi signal, a Bluetooth signal, or a near-field communication signal.

Clause 11. The apparatus of clause 10, wherein the wireless readout is configured for powering by an external electromagnetic signal.

Clause 12. A method of monitoring a component, comprising:
coupling a sensor to a component, the sensor configured to monitor a state of the component;
applying power to the sensor from a capacitor bank, the capacitor bank coupled to the sensor; and
storing data obtained from the sensor, the data relating to the state of the component.

Clause 13. The method of clause 12, further comprising charging the capacitor bank via a power circuit, the power circuit configured to convert an electromagnetic signal to electrical power.

Clause 14. The method of clause 13, further comprising activating electrical power from the capacitor bank to the sensor upon an occurrence of one or more conditions.

Clause 15. The method of clause 14, wherein the one or more conditions includes reaching a threshold charge amount by the capacitor bank.

Clause 16. The method of clause 15, wherein the one or more conditions further includes initiation of an operational mode of the component.

Clause 17. The method of any of clauses 12-16, further comprising transmitting the data obtained from the sensor via a wireless readout.

Clause 18. The method of clause 17, further comprising applying power to the wireless readout from the capacitor bank.

Clause 19. The method of clause 17 or 18, wherein the wireless readout is powered via an external electromagnetic signal.

Clause 20. The method of any of clauses 12-19, wherein the sensor comprises a piezoelectric sensor or an electromagnetic sensor, and wherein the capacitor bank comprises a plurality of thin-sheet capacitors arranged in a stacked assembly.

Clause 21. The method of clause 13, further comprising irradiating the power circuit with the electromagnetic signal.

Clause 22. A component monitoring system, comprising:
a plurality of monitoring devices configured to be coupled to a component of one of an aircraft, a vehicle, or a vessel, wherein each monitoring device comprises:
a sensor configured to monitor a state of the component;
a power circuit configured to convert an electromagnetic signal to electrical power;
a capacitor bank coupled to an output of the power circuit and to the sensor, the capacitor bank arranged to receive electrical power from the power circuit and to supply electrical power to the sensor; and
a wireless readout configured to convert data obtained from the sensor into a wireless communication signal.

Clause 23. The system of clause 22, wherein for each monitoring device:
the electromagnetic signal is a radio frequency (RF) signal; and
the power circuit is configured to convert the RF signal to electrical power via induction.

Clause 24. The system of clause 23, further comprising, for each monitoring device, a switch configured to activate electrical power from the capacitor bank to the sensor upon an occurrence of one or more conditions.

Clause 25. The system of clause 24, further comprising, for each monitoring device, a memory coupled to the sensor, the memory to store the data obtained from the sensor, and wherein the one or more conditions includes reaching a threshold charge amount by the capacitor bank and initiation of an operational mode of the component.

Clause 26. The system of clause 25, wherein each respective sensor in each monitoring device is a same type of sensor.

Clause 27. A method of monitoring a component, comprising:
  coupling a plurality of sensors to a component of one of an aircraft, a vehicle, or a vessel, each sensor configured to monitor a state of the component;
  applying power to each of the plurality of sensors from a respective one of a plurality of capacitor banks, each sensor coupled to the respective one of the plurality of capacitor banks; and
  storing data obtained from each of the plurality of sensors, the data relating to the state of the component.

Clause 28. The method of clause 27, further comprising charging each of the plurality of capacitor banks via a respective one of a plurality of power circuits, each respective power circuit configured to convert an electromagnetic signal to electrical power.

Clause 29. The method of clause 28, further comprising, for each of the plurality of sensors, activating electrical power from the respective capacitor bank to the respective sensor upon an occurrence of one or more conditions,
  wherein the one or more conditions include reaching a threshold charge amount by the respective capacitor bank or initiation of an operational mode of the component.

Clause 30. The method of clause 29, wherein each respective sensor of the plurality of sensors is a same type of sensor.

Clause 31. The method of clause 28 or 29, further comprising, for each of the plurality of sensors:
  applying power to a wireless readout; and
  transmitting the data obtained from the sensor via the wireless readout.

Clause 32. The apparatus of any of clauses 1-11, further comprising a switch configured to activate electrical power from the capacitor bank to the wireless readout upon an occurrence of a readout condition.

Clause 33. The apparatus of any of clauses 1-11, wherein the sensor is an ultrasonic transducer configured to monitor an aircraft component for cracks.

Clause 34. The apparatus of any of clauses 3-11, wherein the switch is further configured to configured to activate electrical power from the capacitor bank to the memory.

Clause 35. The apparatus of any of clauses 3-11, further comprising a microcontroller integrated with the switch to control activation of electrical power to the sensor.

Clause 36. The method of any of clauses 13-21, further comprising irradiating the power circuit with a radio frequency (RF) signal for a sufficient time to charge the capacitor bank to capacity.

Clause 37. The system of any of clauses 22-26, wherein each monitoring device further comprises a switch to switch configured to activate electrical power from the capacitor bank to the wireless readout upon an occurrence of a readout condition.

Clause 38. The system of any of clauses 22-26, wherein each sensor is an ultrasonic transducer configured to monitor an aircraft component for cracks.

Clause 39. The system of any of clauses 24-26, wherein for each monitoring device, the switch is further configured to configured to activate electrical power from the capacitor bank to the memory.

Clause 40. The system of any of clauses 24-26, further comprising a microcontroller coupled to each of the monitoring devices to control activation of electrical power to each of the sensors.

Clause 41. The system of any of clauses 22-26, further comprising a transmitter to generate the electromagnetic signal for irradiating each respective power circuit for charging the respective capacitor bank.

Clause 42. The method of any of clauses 27-31, further comprising irradiating each respective power circuit with a radio frequency (RF) signal for a sufficient time to charge each respective capacitor bank to capacity.

Clause 43. The method of any of clauses 12-21, wherein power is applied to the sensor solely from the capacitor bank.

Clause 44. The method of any of clauses 27-31, wherein power is applied to each of the plurality of sensors solely from the respective one of the plurality of capacitor banks.

In some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the [platform/computing system] within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and applies to electrical, mechanical, fluid, optical, electromagnetic, electromechanical or other connections, including logical connections via intermediate components (e.g., device A may be coupled to device C via device B). In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments described herein can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A monitoring apparatus comprising:
   a sensor configured to monitor a state of a component;
   a power circuit configured to convert an electromagnetic signal to electrical power via induction, wherein the electromagnetic signal is a radio frequency (RF) signal;
   a capacitor bank coupled to an output of the power circuit and to the sensor, the capacitor bank arranged to receive electrical power from the power circuit and to supply electrical power to the sensor; and
   a wireless readout configured to convert data obtained from the sensor into a wireless communication signal.

2. The apparatus of claim 1, further comprising a switch configured to activate electrical power from the capacitor bank to the sensor upon an occurrence of one or more conditions.

3. The apparatus of claim 2, further comprising a memory coupled to the sensor, the memory to store the data obtained from the sensor.

4. The apparatus of claim 2, wherein the one or more conditions includes reaching a threshold charge amount by the capacitor bank.

5. The apparatus of claim 4, wherein the one or more conditions further includes initiation of an operational mode of the component.

6. The apparatus of claim 1, wherein the capacitor bank comprises a plurality of thin-sheet capacitors arranged in a stacked assembly.

7. The apparatus of claim 1, wherein the wireless readout is configured for powering by an external electromagnetic signal.

8. A method of monitoring a component, comprising:
   coupling a sensor to a component, the sensor configured to monitor a state of the component;
   charging a capacitor bank via a power circuit, the power circuit configured to convert a radio frequency (RF) signal to electrical power via induction;
   applying power to the sensor from the capacitor bank, the capacitor bank coupled to the sensor; and
   storing data obtained from the sensor, the data relating to the state of the component.

9. The method of claim 8, further comprising activating electrical power from the capacitor bank to the sensor upon an occurrence of one or more conditions.

10. The method of claim 9, wherein the one or more conditions includes reaching a threshold charge amount by the capacitor bank.

11. The method of claim 10, wherein the one or more conditions further includes initiation of an operational mode of the component.

12. The method of claim 8, further comprising:
    transmitting the data obtained from the sensor via a wireless readout; and
    applying power to the wireless readout from the capacitor bank.

13. The method of claim 12, wherein the wireless readout is powered via an external electromagnetic signal.

14. The method of claim 8, further comprising irradiating the power circuit with the electromagnetic signal.

15. A component monitoring system, comprising:
    a plurality of monitoring devices configured to be coupled to a component of one of an aircraft, a vehicle, or a vessel, wherein each monitoring device comprises:
    a sensor configured to monitor a state of the component;
    a power circuit configured to convert an electromagnetic signal to electrical power via induction, wherein the electromagnetic signal is a radio frequency (RF) signal;
    a capacitor bank coupled to an output of the power circuit and to the sensor, the capacitor bank arranged to receive electrical power from the power circuit and to supply electrical power to the sensor; and
    a wireless readout configured to convert data obtained from the sensor into a wireless communication signal.

16. The system of claim 15, further comprising, for each monitoring device, a switch configured to activate electrical power from the capacitor bank to the sensor upon an occurrence of one or more conditions.

17. The system of claim 16, further comprising, for each monitoring device, a memory coupled to the sensor, the memory to store the data obtained from the sensor, and wherein the one or more conditions includes reaching a threshold charge amount by the capacitor bank and initiation of an operational mode of the component.

18. A monitoring apparatus comprising:
    a sensor configured to monitor a state of a component;
    a power circuit configured to convert an electromagnetic signal to electrical power;
    a capacitor bank coupled to an output of the power circuit and to the sensor, the capacitor bank arranged to receive electrical power from the power circuit and to supply electrical power to the sensor; and
    a wireless readout configured to convert data obtained from the sensor into a wireless communication signal,
    wherein the capacitor bank comprises a plurality of thin-sheet capacitors arranged in a stacked assembly.

19. The apparatus of claim 18, wherein:
    the electromagnetic signal is a radio frequency (RF) signal; and
    the power circuit is configured to convert the RF signal to electrical power via induction.

20. The apparatus of claim 19, further comprising a switch configured to activate electrical power from the capacitor bank to the sensor upon an occurrence of one or more conditions.

21. The apparatus of claim 20, further comprising a memory coupled to the sensor, the memory to store the data obtained from the sensor.

22. The apparatus of claim 20, wherein the one or more conditions includes reaching a threshold charge amount by the capacitor bank.

23. The apparatus of claim 22, wherein the one or more conditions further includes initiation of an operational mode of the component.

24. The apparatus of claim 18, wherein the wireless readout is configured for powering by an external electromagnetic signal.

25. The apparatus of claim 18, wherein the monitoring apparatus is configured to be coupled to a component of one of an aircraft, a vehicle, or a vessel.

26. A component monitoring system, comprising:
a plurality of monitoring devices configured to be coupled to a component of one of an aircraft, a vehicle, or a vessel, wherein each monitoring device comprises:
a sensor configured to monitor a state of the component;
a power circuit configured to convert an electromagnetic signal to electrical power;
a capacitor bank coupled to an output of the power circuit and to the sensor, the capacitor bank arranged to receive electrical power from the power circuit and to supply electrical power to the sensor; and
a wireless readout configured to convert data obtained from the sensor into a wireless communication signal, wherein the capacitor bank comprises a plurality of thin-sheet capacitors arranged in a stacked assembly.

27. The system of claim 26, wherein for each monitoring device:
the electromagnetic signal is a radio frequency (RF) signal; and
the power circuit is configured to convert the RF signal to electrical power via induction.

28. The system of claim 27, further comprising, for each monitoring device, a switch configured to activate electrical power from the capacitor bank to the sensor upon an occurrence of one or more conditions.

29. The system of claim 28, further comprising, for each monitoring device, a memory coupled to the sensor, the memory to store the data obtained from the sensor, and wherein the one or more conditions includes reaching a threshold charge amount by the capacitor bank and initiation of an operational mode of the component.

* * * * *